United States Patent
Lawrence et al.

(10) Patent No.: US 10,025,550 B2
(45) Date of Patent: Jul. 17, 2018

(54) FAST KEYBOARD FOR SCREEN MIRRORING

(71) Applicant: INTEL CORPORATION, Santa Clara, CA (US)

(72) Inventors: Sean J. Lawrence, Bangalore (IN); Raghavendra Angadimani, Bangalore (IN)

(73) Assignee: Intel Corporation, Santa Clara, CA (US)

(*) Notice: Subject to any disclaimer, the term of this patent is extended or adjusted under 35 U.S.C. 154(b) by 85 days.

(21) Appl. No.: 15/070,691

(22) Filed: Mar. 15, 2016

(65) Prior Publication Data

US 2017/0269894 A1 Sep. 21, 2017

(51) Int. Cl.
| G06F 3/14 | (2006.01) |
| G06F 3/02 | (2006.01) |
| G06T 1/20 | (2006.01) |
| H04L 29/06 | (2006.01) |

(52) U.S. Cl.
CPC .......... G06F 3/1454 (2013.01); G06F 3/0227 (2013.01); G06T 1/20 (2013.01); H04L 65/607 (2013.01); H04L 65/80 (2013.01)

(58) Field of Classification Search
CPC ........ G06F 3/1454; G06F 3/0227; G06T 1/20; H04L 65/607; H04L 65/80
See application file for complete search history.

(56) References Cited

U.S. PATENT DOCUMENTS

| 5,524,198 | A | * | 6/1996 | Matsumoto | G06F 17/214 715/781 |
| 5,940,081 | A | * | 8/1999 | Guo | G06T 11/203 345/442 |
| 8,364,601 | B2 | * | 1/2013 | Dewan | G06F 21/36 705/50 |
| 9,392,315 | B1 | * | 7/2016 | Lang | H04N 21/4122 |
| 2005/0007372 | A1 | * | 1/2005 | Ecob | G06T 11/40 345/473 |
| 2006/0106494 | A1 | * | 5/2006 | Alvarez | G05B 19/409 700/251 |
| 2009/0183200 | A1 | * | 7/2009 | Gritton | H04N 7/165 725/37 |
| 2014/0281894 | A1 | * | 9/2014 | Maity | G06F 9/4445 715/234 |
| 2014/0372620 | A1 | * | 12/2014 | Vedula | H04W 76/02 709/228 |
| 2017/0064498 | A1 | * | 3/2017 | Manges | H04W 4/02 |
| 2018/0048679 | A1 | * | 2/2018 | Huang | H04L 65/00 |

* cited by examiner

*Primary Examiner* — Duc C Ho
(74) *Attorney, Agent, or Firm* — International IP Law Group, P.L.L.C.

(57) ABSTRACT

An apparatus is described herein. The apparatus includes a controller and a screen mirror unit. The controller is to identify input parameters and transmit the input parameters out of band to a sink. The screen mirror unit is to transmit input data and coordinates out of band to the sink, where the input data is rendered based on the input parameters and coordinates.

22 Claims, 4 Drawing Sheets

FAST KEYBOARD FOR SCREEN MIRRORING

BACKGROUND ART

A personal area network (PAN) can be used for communication between a plurality of computing devices or for connecting to a higher level network, such as a local area network (LAN) or the Internet. In some cases, the plurality of computing devices are personal computing devices, such as laptops, mobile devices, tablets, phablets and the like.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

A PAN can be used for streaming audio and video (AV) data from one device to another device, such as a desktop computer, television, or a display. The PAN can stream screen mirroring data in real time between devices that access the PAN. Real time PAN AV streaming solutions include, but are not limited to Wireless Display (WiDi) and Miracast.

Real time PAN AV streaming solutions include at least two modes based on the selected usage scenario. For example, a first mode where a user is interacting with the computing devices typically includes AV encoding parameters that are modified to suit interactive scenarios and use cases. This first mode may be referred to as a low latency mode. A second mode where AV encoding parameters are modified such that the quality of the AV stream is the best or reasonably good may be referred to as a quality mode. In embodiments, the second mode may be best when compared to the first mode. Additionally, in embodiments, the second mode may have any one of a higher latency, higher bitrate, a higher resolution, or any combination thereof, when compared to the first mode.

Some quality mode implementations of screen mirroring have latencies around ~200 ms due to encode, decode, and network processing. For scenarios where the user uses only the remote screen (and no local screen) while typing, this latency becomes noticeable and can be irritating. The latency is more pronounced when the user is a proficient typist. Current solutions aim at reducing latency which compromise video quality. Interoperation with multiple sinks does not guarantee a reduction in latency, even though the latency may be optimized with one source/sink pair.

Embodiments described herein enable a fast keyboard for screen mirroring. In embodiments, the present techniques enable high playback quality with fast rendering of keystrokes. Keystrokes may be rendered via an out of band transmission. In the case of multicast systems, the present techniques may enable a single sink replicated across all the receiving sinks with a single transmitter sending the same content to all the sinks.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
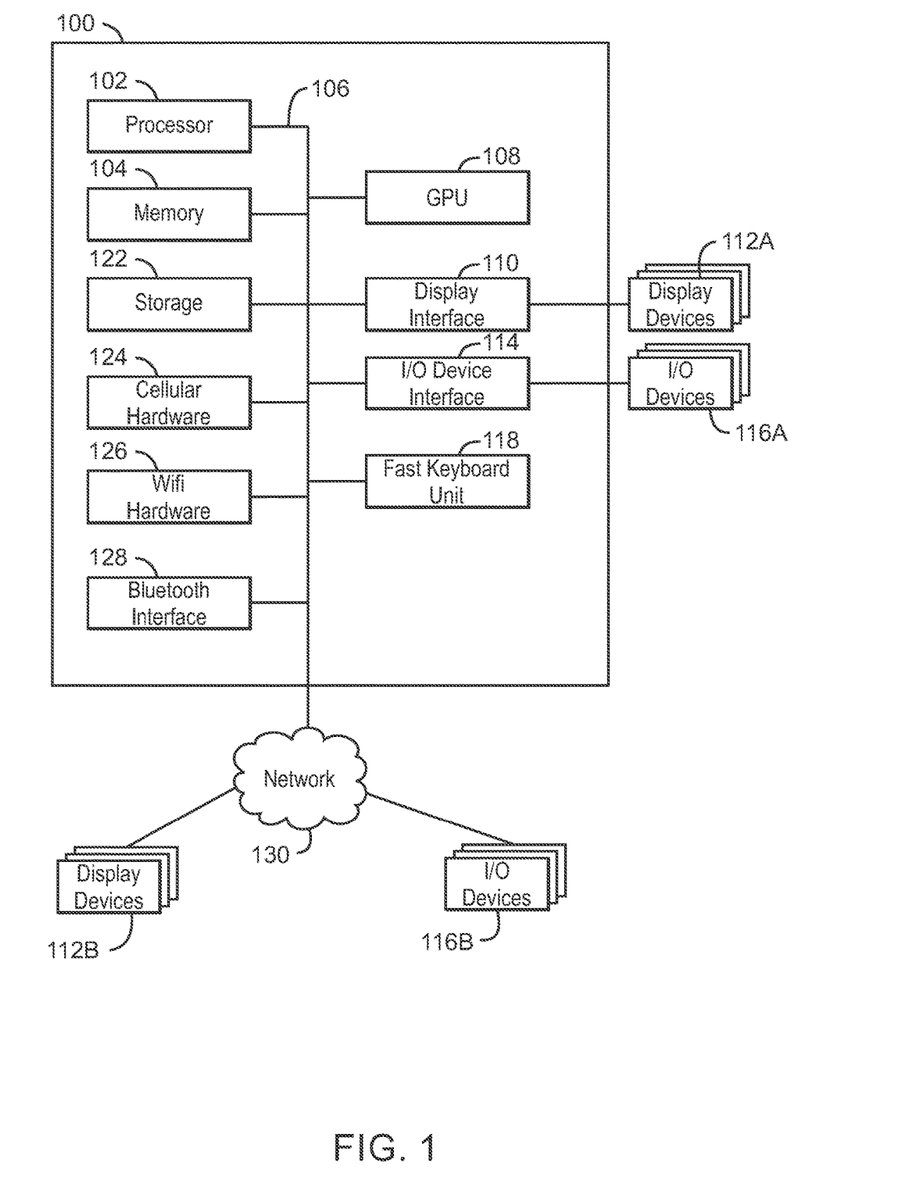
FIG. 1 is a block diagram of an exemplary system for a fast keyboard for screen mirroring.

FIG. 1 is a block diagram of an exemplary system for a fast keyboard for screen mirroring. The electronic device 100 may be, for example, a laptop computer, tablet computer, mobile phone, smart phone, or a wearable device, among others. The electronic device 100 may be used to connect to a PAN as described above such as a network 130. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112A and 112B. The display devices 112A can include a display screen that is a built-in component of the electronic device 100. In embodiments, the display interface 110 is coupled with the display devices 112B via any networking technology such as cellular hardware 124, Wifi hardware 126, or a Bluetooth Interface 128 across the network 130. The display devices 112B can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116A and 116B. The I/O devices 116A can include, for example, a keyboard and a pointing device, wherein the pointing device can include a touchpad or a touchscreen, among others. The I/O devices 116A can be built-in components of the electronic device 100, or can be devices that are externally connected to the electronic device 100. Accordingly, in embodiments, the I/O device interface 114 is coupled with the I/O devices 116B via any networking technology such as cellular hardware 124, Wifi hardware 126, or Bluetooth Interface 128 across the network 130. The I/O devices 116B can also include any I/O device that is externally connected to the electronic device 100.

The electronic device 100 also includes a fast keyboard unit 118. The fast keyboard unit is to extract the font information used to generate characters resulting from keystrokes at a keyboard. Font information, as used herein, includes characteristics that define the font family, typeface, boldness, size, weight, color, pitch, spacing and the style of text. Font information may also be specified by a true type font file. Additionally, the font information may include the particular coordinates of text to be rendered. The fast keyboard unit 118 may extract the font information and transmit the font information to a remote device for rendering keystrokes from the electronic device 100. In embodiments, the font information is transmitted via a sideband or out of band transmission.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 130 without being tethered or paired to another device, where the network 130 is a cellular network.

The CPU 102 may also be linked through the bus 106 to WiFi hardware 126. The WiFi hardware 126 is hardware according to WiFi standards (standards promulgated as Institute of Electrical and Electronics Engineers' (IEEE) 802.11 standards). The WiFi hardware 126 enables the wearable electronic device 100 to connect to the Internet using the Transmission Control Protocol and the Internet Protocol (TCP/IP), where the network 130 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the wearable electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

The font information may be sent out of band to a screen mirroring sink. The particular character and the coordinates of the character to be rendered is also transmitted to the sink in an out of band fashion. In embodiments, the font information is sent to the sink and stored at the sink. In this manner, the sink will have access to the font information in order to render incoming characters on the remote screen using coordinates of the characters before the video frame that actually contains the character reaches the sink. This out of band transmission of characters will be faster than an in band transmission due to less data and processing requirements during out of band transmission. Moreover, the out of band transmission reduces latency without a compromise to playback quality or other data plane parameters. In embodiments, a data plane or data pipe refers to a transmit path and processing functions that act on the data in the system. Some examples of data plane parameters in a wireless display (WiDi) scenario are AV encode parameters, jitter buffer and/or buffer sizes on the decoder, decoder parameters, and the like.

Screen mirroring as described herein may be performed according to a wireless display (WiDi) technique. WiDi is a screen mirroring technique by which frames to be rendered on a local display of a computing device are rendered on a remote display via a wireless connection. For example, a tablet device may send frames to be rendered at a television instead of on the local display typically included with tablet devices. In embodiments, WiDi may be used for online video playback over a web browser and video chat. Similarly, Miracast is a screen mirroring certification standard that enables peer-to-peer wireless delivery of audio and video or other screen content between different devices based upon the 802.11 standard.

Figure 2:
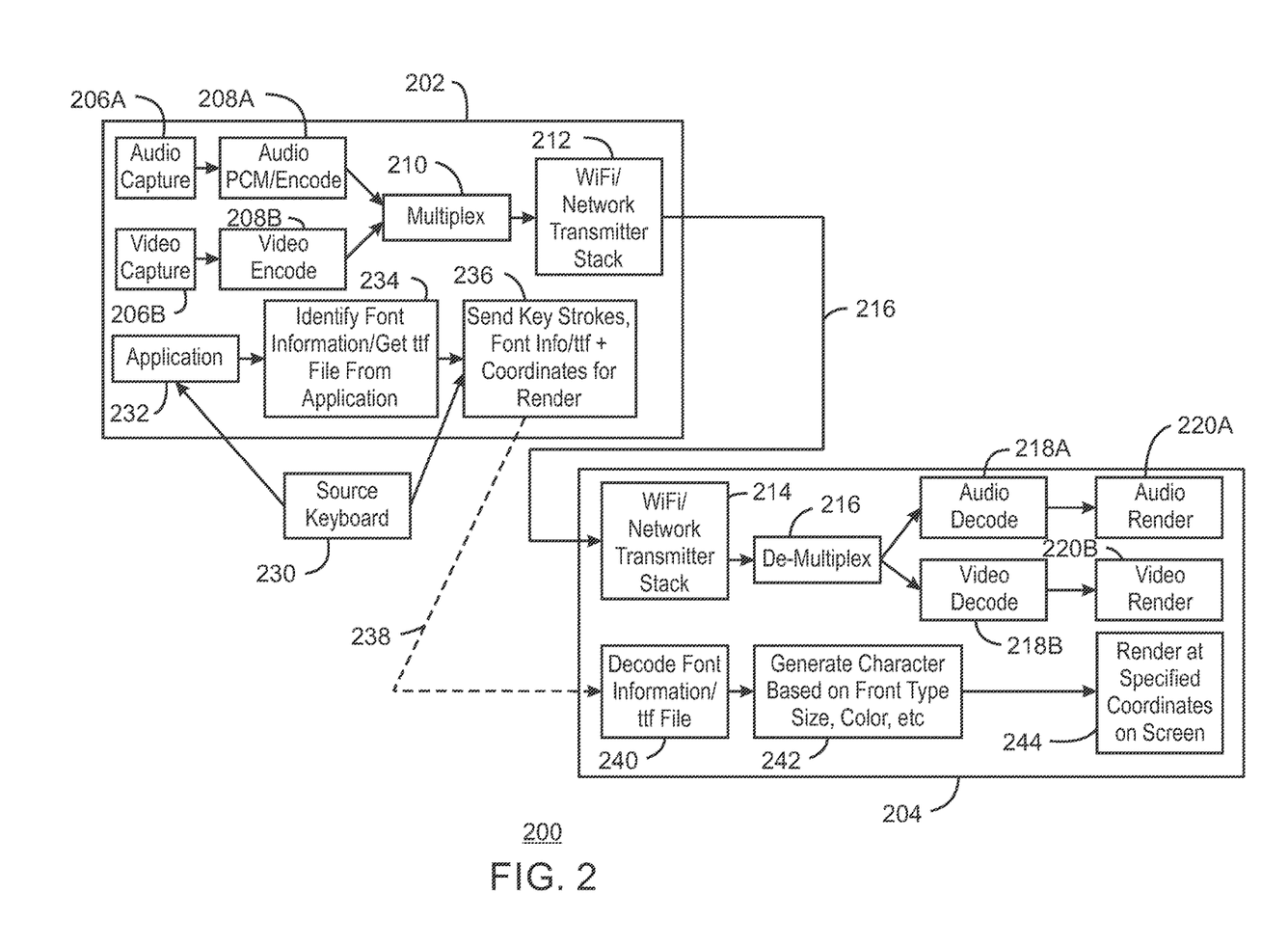
FIG. 2 is an illustration of system that transmits screen mirroring data.

FIG. 2 is an illustration of system 200 that transmits screen mirroring data. The system 200 includes a transmitter 202 and receiver 204. The transmitter may be a device that is transmitting screen mirroring data to the receiver 204, where the receiver 204 is a second device. The transmitter 202 captures audio data at block 206A, and video data is captured at block 206B. In embodiments, the audio data may be captured from an audio file that is stored on the first device. The audio data may also be captured from a file that is streaming across a network such as the Internet. Similarly, the video data may be captured from a video file that is stored on the first device, and the video data may also be captured from a file that is streaming across a network such as the Internet.

The audio data is encoded at block 208A, and the video data is encoded at block 208B. Audio encoding may be enabled via an audio codec. During the audio encoding, the audio data may be compressed according to any audio compression format. The video encoding may be enabled via a video codec. During the video encoding, the video data may be compressed according to any video compression format. Each of the audio and video encoding may be used to convert raw data to a compressed format that is suitable for output and/or transmission.

At block 210, encoded audio data and the encoded video data is output to a multiplexer 210. The multiplexer 210 is to combine the encoded audio data and the encoded video data into a single data stream for further output and/or transmission. At block 212, a WiFi/network transmitter stack connection is used to transmit the data stream to a receiver. The WiFi/network transmitter stack defines several layers that each perform a specific task in transmitting and receiving data. Data is passed from layer to layer, typically beginning with the physical layer and ending with the application layer.

Data is transmitted from the WiFi/network transmitter stack 212 of the transmitter 202 to the WiFi/network receiver stack 214 of the receiver via a WiFi connection as illustrated by line 216. In embodiments, the line 216 represents an in band data transmission. In examples, the in band transmission may be according to WiDi transmission standards or Miracast transmission standards. This wireless transmission represented by the line 216 enables peer-to-peer connectivity with a second device connected to a PAN by addressing, routing, transmitting, and receiving data according to the TCP/IP protocol. Received data at the receiver 204 is passed from layer to layer within the WiFi/network receiver stack 214. Data is passed from layer to layer, with each layer performing a specific task in the reception of data. At block 217, the data is de-multiplexed from a single data stream into separate encoded audio and encoded video streams. At block 218A, the encoded audio data is decoded, and at block 218B, the encoded video data is decoded. At block 220A, the audio is rendered. At block 220B, the video is rendered. The audio and data are rendered in a coordinated fashion, such that frames of audio are rendered with corresponding frames of video.

During traditional screen mirroring, characters typed on the source are transmitted as part of pixel information in the video frame and will be rendered at the sink with the same latency as other video frame data. Put another way, traditional keystroke rendering transmits font information and the keystrokes to the receiver via the WiFi network transmitter stack 212, the WiFi data path 216, and the WiFi network receiver stack 214 as a component of the video frame. Processing keystrokes and font information along this in band data path results in a noticeable delay from the time a user enters a keystroke to the time that the keystroke is observed on the remote screen. This delay is even more severe where the user can enter keystrokes at a fast rate. Referring to FIG. 2, the latency introduced when rendering keystrokes in conjunction with data streaming is due to latency and other processing associated with the each of blocks 206A-220B. The additional latency is also caused due to the video encode and multiplexing on the transmitter as well as the video decoding, de-multiplexing, and rendering on the receiver at block 214-220B.

Accordingly, the present techniques transmit font information, the keystrokes, and other keyboard data to the receiver via a side band or out of band data path via blocks 232-244. In this manner, the latency associated with traditional keystroke processing is eliminated. In embodiments, the reduction in latency is due to the out of band transmission of the coordinates, which does not tie transmission of the coordinates and other keyboard information it to the video pipeline which is inherently delayed due to the amount of processing involved. Thus, an out of band data stream may be used to transmit keystroke data on a different WiFi port when compared to the audio/video data.

A source keyboard is represented by block 230. The source keyboard may send keystroke information to an application 232. The application 232 may be any of a gaming, word processing, video chat, email, or web browsing application. At block 234, the font information and/or truetype file is received from the application 232. An out of band transmitter at block 236 is to send the font information and/or truetype file obtained from the application 232 to the receiver 204 via an out of band or side band path represented by line 238. The out of band transmitter 236 also transmits the keystrokes and coordinates to the receiver 204 via the data path 238. In embodiments, the data path 238 is transmitted via the WiFi network transmitter stack 218, but on a different transmitter port when compared to the audio video data transmitted via the in band data path 216.

At block 240, font information and/or truetype file sent to the receiver is decoded. In embodiments, font information and/or truetype file obtained from the application 232 is stored at the receiver for use in rendering keystrokes at the receiver. At block 242, font information and/or truetype file is used to generate characters that correspond to received font information and/or truetype file obtained from the application 232. At block 244, the characters are rendered at specified coordinates on the remote display screen.

The font information and/or truetype file obtained from the application 232 is transmitted to the receiver once, as necessary. The font information and/or truetype file for multiple fonts may be transmitted to the receiver at a single time. Thus, as the font changes as the user enters keystrokes, the appropriate font information and/or truetype file is available at the receiver. The keystrokes from the source keyboard 230 are also transmitted directly to block 236, where they are processed for output and/or transmission to the receiver 204.

In FIG. 2, the font information or the truetype file being used is extracted from the application and is sent out of band to the sink and is not part of the traditional screen mirroring session. In embodiments, keyboard interrupts and strokes indicate which character is being typed. On reception of the font information/TTF, the keyboard strokes and coordinates, the sink decodes the font information and/or TTF file and applies it to a font rendering application on the sink that will render appropriate characters (font type, size, color) at the specified coordinates. The video frame containing the same characters typed on the source (appearing on the source screen) arrives later, after the out of band keystroke information. After a certain duration, the character rendered at the sink will be made to fade away revealing only the frame with character that was sent. In embodiments, this duration should be equal to or slightly greater than the video latency between the source and sink along the screen mirroring data path (e.g., data path 216) so that this transition is not noticeable to the user.

Figure 3:
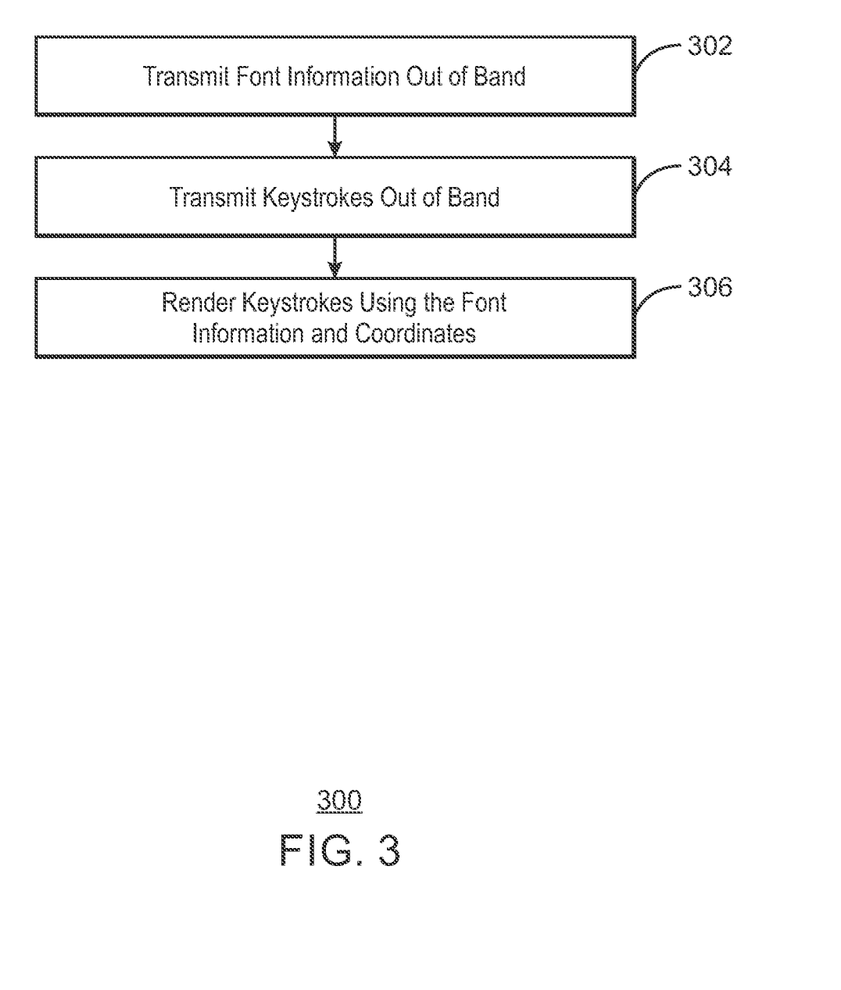
FIG. 3 is a process flow diagram of a method for screen mirroring with a fast keyboard.

FIG. 3 is a process flow diagram of a method for screen mirroring with a fast keyboard. At block 302, font information is transmitted out of band to a sink. As used herein, out of band refers to a communication path that is independent from the main in-band data stream. The data sent via the out of band communication path is separate from in-band data. At block 304, keystrokes are transmitted out of band to a sink. At block 306, the keystrokes are rendered at a remote display using the font information and coordinates of the keystrokes.

In embodiments, the rendered keystrokes "fade away" when video frames are rendered by the transmitter that include the rendered keystrokes. As used herein, to fade away refers to keystrokes that are immediately apparent and rendered, and then are made to disappear over a predetermined time period. Thus, the input data including the keystrokes are rendered based on the font information or input parameters and coordinates, until a frame including corresponding input data is rendered. When a frame including corresponding input data is rendered, the keystroke can disappear revealing the same keystroke as transmitted with the video stream.

In this manner, the traditional screen mirroring data path is not altered. Rather, the keystrokes sent to the sink via an out of band data path are rendered at the remote display in near real time. As used herein, near real time and fast refers to rendering at a speed which is free from the latency associated with a screen mirroring pipeline that includes transmission and/or reception via encoding, decoding and a networking stack. However, near real time and fast may also refer to rendering faster than what is possible when the keystrokes are rendered as part of the pixel information in the frame transmitted via screen mirroring. Moreover, near real time and fast may refer to rendering keystrokes such that any delay is imperceptible to a user. In embodiments, the TTF file and character type information need only be sent to the sink once per application or until the font is changed. Subsequently only keystrokes and coordinates are sent to the sink. In embodiments, the sink may store TTF file, character type information, font information, and the like for a plurality of fonts. When a font is selected, the source may send some indication of the new font to the receiver, such as a flag or marker. Additionally, in embodiments, keystroke coordinates may not be sent if additional information is sent on line width spacing, etc. For example, instead of sending coordinate information of keystrokes, the fast keyboard characters may be rendered on the remote screen by sending formatting information such as line width, line spacing, new line characters such as "enter," and the like. Thus, the coordinates may not be transmitted when the input parameters include information that enables the location of keystrokes to be determined, such as line width spacing, new line characters, and other formatting information. Further, the TTF file and character type information may be compressed to minimize the data being transmitted. However, this compression may introduce latency due compression and decompression of the character information.

The benefit of out of band transmission of character information over frames can be illustrated by their relative data transmission requirements. For a 1080 p video, average frame sizes are typically around 200 KB to 400 kB (for 30 fps at 12 Mbps). By contrast, sending character information would require only a few bytes. Assuming 4 Bytes per character at the same bitrate (12 Mbps), this requires 4/400K=10-5 times less time to transmit and process the character/font information. Even if 40 bytes were required per character, the separate transmission of font information it would still be 10-4 times faster than traditional transmission. An additional point to consider is that keyboard input will always be less than the frames transmitted per second and would require less updates. Using this scaling logic, the potential latency of sending and displaying a character out of band from a Miracast/WiDock session would be 200 ms*10-4=0.02 ms compared with the 200 ms latency (or lower in the case of WiDock) to update a frame with the new character.

In embodiments, any input/output data can be sent to the receiver out of band. For example, cursor position from a mouse can be sent out of band to implement a fast mouse. In another example, touchscreen input can be sent to the sink out of band to implement a fast touchscreen in screen mirroring. Additionally, in embodiments, the data sent via the out of band communication path may be flagged for out of band transmission. A controller can then route the flagged data for out of band transmission.

Figure 4:
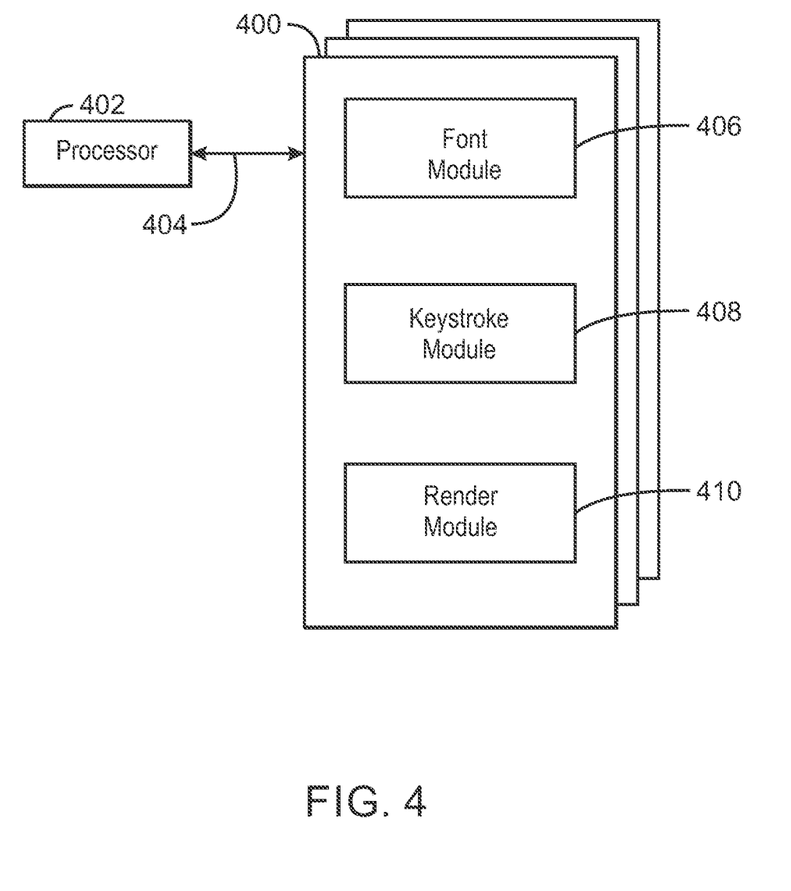
FIG. 4 is a block diagram showing media that contains logic for screen mirroring with a fast keyboard.

FIG. 4 is a block diagram showing media 400 that contains logic for screen mirroring with a fast keyboard. The media 400 may be a computer-readable medium, including a non-transitory medium that stores code that can be accessed by a processor 402 over a computer bus 404. For example, the computer-readable media 400 can be volatile or non-volatile data storage device. The media 400 can also be a logic unit, such as an Application Specific Integrated Circuit (ASIC), a Field Programmable Gate Array (FPGA), or an arrangement of logic gates implemented in one or more integrated circuits, for example.

The media 400 may include modules 406-410 configured to perform the techniques described herein. For example, a font module 406 may be configured to extract font information and transmit the font information out of band. A keystroke module 408 may be configured to capture keystrokes and coordinates of each respective keystroke and transmit the keystrokes and coordinates out of band. A render module 410 may be configured to render the keystrokes using the coordinates and font information at a remote display. In some embodiments, the modules 407-410 may be modules of computer code configured to direct the operations of the processor 402.

The block diagram of FIG. 4 is not intended to indicate that the media 400 is to include all of the components shown in FIG. 4. Further, the media 400 may include any number of additional components not shown in FIG. 4, depending on the details of the specific implementation.

Example 1 is an apparatus. The apparatus includes a controller to identify input parameters and transmit the input parameters out of band to a sink; and a screen mirror unit to transmit input data and coordinates out of band to the sink, where the input data is rendered based on the input parameters and coordinates at the sink.

Example 2 includes the apparatus of example 1, including or excluding optional features. In this example, the input parameters comprise font information.

Example 3 includes the apparatus of any one of examples 1 to 2, including or excluding optional features. In this example, the input data is a plurality of keystrokes.

Example 4 includes the apparatus of any one of examples 1 to 3, including or excluding optional features. In this example, the input parameters comprise a truetype font file.

Example 5 includes the apparatus of any one of examples 1 to 4, including or excluding optional features. In this example, the sink stores the input parameters and renders the input data by applying the input parameters to the input data.

Example 6 includes the apparatus of any one of examples 1 to 5, including or excluding optional features. In this example, the out of band transmission bypasses an in band communication path.

Example 7 includes the apparatus of any one of examples 1 to 6, including or excluding optional features. In this example, the out of band transmission bypasses audio and video encoding and decoding.

Example 8 includes the apparatus of any one of examples 1 to 7, including or excluding optional features. In this example, the input parameters and the input data are not transmitted as a component of pixel information of a frame.

Example 9 includes the apparatus of any one of examples 1 to 8, including or excluding optional features. In this example, the input data is rendered based on the input parameters and coordinates until a frame including corresponding input data is rendered.

Example 10 includes the apparatus of any one of examples 1 to 9, including or excluding optional features. In this example, the input data and coordinates are compressed for transmission.

Example 11 is a method. The method includes identifying input parameters; transmitting the input parameters out of band to a sink; transmitting input data and coordinates out of band to the sink, and rendering the input data based on the input parameters and coordinates.

Example 12 includes the method of example 11, including or excluding optional features. In this example, the input parameters comprise font information.

Example 13 includes the method of any one of examples 11 to 12, including or excluding optional features. In this example, the input data is a plurality of keystrokes.

Example 14 includes the method of any one of examples 11 to 13, including or excluding optional features. In this example, the input parameters comprise a truetype font file.

Example 15 includes the method of any one of examples 11 to 14, including or excluding optional features. In this example, the sink stores the input parameters and renders the input data by applying the input parameters to the input data.

Example 16 includes the method of any one of examples 11 to 15, including or excluding optional features. In this example, the out of band transmission bypasses an in band communication path.

Example 17 includes the method of any one of examples 11 to 16, including or excluding optional features. In this example, the coordinates are not transmitted when the input parameters include line width spacing, new line characters, and other formatting information.

Example 18 includes the method of any one of examples 11 to 17, including or excluding optional features. In this example, the input parameters and the input data are not transmitted as a component of pixel information of a frame.

Example 19 includes the method of any one of examples 11 to 18, including or excluding optional features. In this example, the input data is rendered based on the input parameters and coordinates until a frame including corresponding input data is rendered.

Example 20 includes the method of any one of examples 11 to 19, including or excluding optional features. In this example, the input data and coordinates are compressed for transmission.

Example 21 is a computer-readable medium. The computer-readable medium includes instructions that direct the processor to identify input parameters; transmit the input parameters out of band to a sink; transmit input data and coordinates out of band to the sink, and render the input data based on the input parameters and coordinates.

Example 22 includes the computer-readable medium of example 21, including or excluding optional features. In this example, the input parameters comprise font information.

Example 23 includes the computer-readable medium of any one of examples 21 to 22, including or excluding optional features. In this example, the input data is a plurality of keystrokes.

Example 24 includes the computer-readable medium of any one of examples 21 to 23, including or excluding optional features. In this example, the input parameters comprise a truetype font file.

Example 25 includes the computer-readable medium of any one of examples 21 to 24, including or excluding optional features. In this example, the sink stores the input parameters and renders the input data by applying the input parameters to the input data.

Example 26 includes the computer-readable medium of any one of examples 21 to 25, including or excluding optional features. In this example, the out of band transmission bypasses an in band communication path.

Example 27 includes the computer-readable medium of any one of examples 21 to 26, including or excluding optional features. In this example, the coordinates are not transmitted when the input parameters include line width spacing, new line characters, and other formatting information.

Example 28 includes the computer-readable medium of any one of examples 21 to 27, including or excluding optional features. In this example, the input parameters and the input data are not transmitted as a component of pixel information of a frame.

Example 29 includes the computer-readable medium of any one of examples 21 to 28, including or excluding optional features. In this example, the input data is rendered based on the input parameters and coordinates until a frame including corresponding input data is rendered.

Example 30 includes the computer-readable medium of any one of examples 21 to 29, including or excluding optional features. In this example, the input data and coordinates are compressed for transmission.

Example 31 is a system. The system includes instructions that direct the processor to a display; a radio; a memory that is to store instructions and that is communicatively coupled to the display; and a processor communicatively coupled to the radio and the memory, wherein when the processor is to execute the instructions, the processor is to: identify input parameters; transmit the input parameters out of band to a sink; transmit input data and coordinates out of band to the sink, and render the input data based on the input parameters and coordinates.

Example 32 includes the system of example 31, including or excluding optional features. In this example, the input parameters comprise font information.

Example 33 includes the system of any one of examples 31 to 32, including or excluding optional features. In this example, the input data is a plurality of keystrokes.

Example 34 includes the system of any one of examples 31 to 33, including or excluding optional features. In this example, the input parameters comprise a truetype font file.

Example 35 includes the system of any one of examples 31 to 34, including or excluding optional features. In this example, the sink stores the input parameters and renders the input data by applying the input parameters to the input data.

Example 36 includes the system of any one of examples 31 to 35, including or excluding optional features. In this example, the out of band transmission bypasses an in band communication path.

Example 37 includes the system of any one of examples 31 to 36, including or excluding optional features. In this example, the coordinates are not transmitted when the input parameters include line width spacing, new line characters, and other formatting information.

Example 38 includes the system of any one of examples 31 to 37, including or excluding optional features. In this example, the input parameters and the input data are not transmitted as a component of pixel information of a frame.

Example 39 includes the system of any one of examples 31 to 38, including or excluding optional features. In this example, the input data is rendered based on the input parameters and coordinates until a frame including corresponding input data is rendered.

Example 40 includes the system of any one of examples 31 to 39, including or excluding optional features. In this example, the input data and coordinates are compressed for transmission.

Example 41 is an apparatus. The apparatus includes instructions that direct the processor to a means to identify input parameters and transmit the input parameters out of band to a sink; and a means to transmit input data and coordinates out of band to the sink, where the input data is rendered based on the input parameters and coordinates at the sink.

Example 42 includes the apparatus of example 41, including or excluding optional features. In this example, the input parameters comprise font information.

Example 43 includes the apparatus of any one of examples 41 to 42, including or excluding optional features. In this example, the input data is a plurality of keystrokes.

Example 44 includes the apparatus of any one of examples 41 to 43, including or excluding optional features. In this example, the input parameters comprise a truetype font file.

Example 45 includes the apparatus of any one of examples 41 to 44, including or excluding optional features.

In this example, the sink stores the input parameters and renders the input data by applying the input parameters to the input data.

Example 46 includes the apparatus of any one of examples 41 to 45, including or excluding optional features. In this example, the out of band transmission bypasses an in band communication path.

Example 47 includes the apparatus of any one of examples 41 to 46, including or excluding optional features. In this example, the out of band transmission bypasses audio and video encoding and decoding.

Example 48 includes the apparatus of any one of examples 41 to 47, including or excluding optional features. In this example, the input parameters and the input data are not transmitted as a component of pixel information of a frame.

Example 49 includes the apparatus of any one of examples 41 to 48, including or excluding optional features. In this example, the input data is rendered based on the input parameters and coordinates until a frame including corresponding input data is rendered.

Example 50 includes the apparatus of any one of examples 41 to 49, including or excluding optional features. In this example, the input data and coordinates are compressed for transmission.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
an out of band transmitter to obtain input parameters and transmit the input parameters out of band to a sink; and
the out of band transmitter to transmit input data and coordinates of the input data out of band to the sink, where the input data is rendered based on the input parameters and coordinates at the sink.

2. The apparatus of claim 1, wherein the input parameters comprise font information.

3. The apparatus of claim 1, wherein the input data is a plurality of keystrokes.

4. The apparatus of claim 1, wherein the input parameters comprise a truetype font file.

5. The apparatus of claim 1, wherein the sink stores the input parameters and renders the input data by applying the input parameters to the input data.

6. The apparatus of claim 1, wherein the input parameters and the input data are not transmitted as a component of pixel information of a frame transmitted to the sink via screen mirroring.

7. The apparatus of claim 6, wherein the input data is rendered based on the input parameters and coordinates until a frame including corresponding input data is rendered.

8. The apparatus of claim 1, wherein the input data and coordinates are compressed for transmission.

9. A method, comprising:
identifying input parameters that are input to a first device;
transmitting the input parameters out of band to a sink of a second device;
transmitting input data and coordinates of the input data from the first device out of band to the sink of the second device, and
rendering the input data based on the input parameters and coordinates at a remote display screen of the second device.

10. The method of claim 9, wherein the input parameters comprise font information.

11. The method of claim 9, wherein the input data is a plurality of keystrokes.

12. The method of claim 9, wherein the input parameters comprise a truetype font file.

13. The method of claim 9, wherein the sink stores the input parameters and renders the input data by applying the input parameters to the input data.

14. The method of claim 9, wherein the out of band transmission bypasses an in band communication path.

15. The method of claim 9, wherein the coordinates are not transmitted when the input parameters include line width spacing, new line characters, and other formatting information.

16. A computer-readable medium, comprising instructions that, when executed by the processor, direct the processor to:
identify input parameters that are input to a first device;
transmit the input parameters out of band to a sink of a second device;
transmit input data and coordinates of the input data from the first device out of band to the sink of the second device; and
render the input data based on the input parameters and coordinates at a remote display screen of the second device.

17. The computer-readable medium of claim 16, wherein the input parameters comprise font information.

18. A system, comprising:
a display;
a memory that is to store instructions and that is communicatively coupled to the display; and
a processor communicatively coupled to the memory, wherein when the processor is to execute the instructions, the processor is to:
identify input parameters;
transmit the input parameters out of band to a sink;
transmit input data and coordinates out of band to the sink, and
render the input data based on the input parameters and coordinates.

19. The system of claim 18, wherein the input parameters comprise font information.

20. The system of claim 18, wherein the input data is a plurality of keystrokes.

21. The system of claim 18, wherein the input parameters comprise a truetype font file.

22. The system of claim 18, wherein the sink stores the input parameters and renders the input data by applying the input parameters to the input data.

* * * * *